(12) United States Patent
Sikora

(10) Patent No.: US 6,422,380 B1
(45) Date of Patent: Jul. 23, 2002

(54) VARIABLE-CAPACITY BUFFER STORE FOR ROD-SHAPED ARTICLES

(75) Inventor: Leszek Sikora, Radom (PL)

(73) Assignee: International Tobacco Machinery Poland LTD, Radom (PL)

(*) Notice: Subject to any disclaimer, the term of this patent is extended or adjusted under 35 U.S.C. 154(b) by 0 days.

(21) Appl. No.: 09/601,999

(22) PCT Filed: Feb. 26, 1999

(86) PCT No.: PCT/PL99/00004
§ 371 (c)(1),
(2), (4) Date: Oct. 31, 2000

(87) PCT Pub. No.: WO99/44446
PCT Pub. Date: Sep. 10, 1999

(30) Foreign Application Priority Data

Mar. 2, 1998 (PL) .............................. 325109

(51) Int. Cl.⁷ ........................... A24C 5/35; B65G 21/18
(52) U.S. Cl. ....................................... 198/812; 198/778
(58) Field of Search .............................. 198/812, 778, 198/594, 572

(56) References Cited

U.S. PATENT DOCUMENTS

| | | | | |
|---|---|---|---|---|
| 4,339,025 A | * | 7/1982 | McCombie | 198/778 X |
| 5,361,888 A | * | 11/1994 | Brown et al. | 198/778 X |
| 5,413,213 A | | 5/1995 | Golz et al. | 198/778 |
| 5,490,589 A | | 2/1996 | Golz et al. | 198/444 |
| 5,680,923 A | * | 10/1997 | Gram | 198/778 |
| 5,845,765 A | * | 12/1998 | Gram | 198/778 |
| 6,053,304 A | * | 4/2000 | Biagiotti | 198/812 X |
| 6,065,585 A | * | 5/2000 | Bryant et al. | 198/812 X |

FOREIGN PATENT DOCUMENTS

| | | |
|---|---|---|
| DE | 42 24 609 A1 | 1/1994 |
| EP | 0 738 478 B1 | 7/2000 |
| FR | 2576582 * | 8/1986 ................ 198/812 |

* cited by examiner

Primary Examiner—Stephen T. Gordon
Assistant Examiner—Patricia Engle
(74) Attorney, Agent, or Firm—Armstrong, Westerman & Hattori, LLP

(57) ABSTRACT

In the store at the inlet of the transport sector (11) is situated the first drive mechanism (21) of the conveyor (8) which is controlled by and connected to a fullness sensor (22) assembled in the input station (16) via a control unit, and at exit of the transport sector (11) is situated a second drive mechanism (23) of the conveyor (8) which is controlled by and connected to a fullness sensor (24) assembled in the output station (17) via a control unit, while the transport sector (11) is defined by two, active and passive, identical support guide mechanisms (10, 15) for the conveyor (8), consist of independent disc modules (6) rotary assembled on the axes (5, 14), moreover the return sector (9) consists of two, active and passive, identical support guide mechanisms (7, 13) of the conveyor (8), that consist also of independent disc modules (6) rotary assembled on the axes (4, 12), while the axis (5) of the active support guide mechanism (10) in the transport sector (11) is fixed to the axis (4) of the active support guide mechanism (7) in the return sector (9) by the carriage (3) moveable assembled on the horizontal guide bar (2), of a frame (1) of the store in the plane perpendicular to the axes (5, 4). Moreover the disc modules (6) are assembled at an angle to the axes (4, 5, 12, 14) of the support guide mechanism (7, 10, 13, 15), and also the planes of the disc modules (6) in every support guide mechanism (7, 10, 13, 15) are parallel each one to other and axes (4, 5, 12, 14) are situated beneficially in the one plane. Moreover the input station (16) and the output station (17) can be situated perpendicular to the conveyor (8) trajectory. The store has a tensioning device (25) for the conveyor (8) and moreover the horizontal guide bars (26) assembled to the frame (1) in the zone of action of the support guide mechanism (7, 10, 13, 15), below the conveyor (8).

8 Claims, 2 Drawing Sheets

VARIABLE-CAPACITY BUFFER STORE FOR ROD-SHAPED ARTICLES

The object of the invention is a variable-capacity buffer store for rod-shaped articles designed particularly for storing cigarettes supplied from a production machine and transferring cigarettes to a receiving machine e.g. packing machine. This store is used for compensating the differences between the work speed of those two cooperating machines.

BACKGROUND

The known modern production lines for the production and the packing of cigarettes comprises, the production machine or set of machines for the production of cigarettes and the packing machines or set of packing machines, to compensate for the unequal efficiency of both mentioned machines, the different storing apparatus are used in the production lines situated between the production machine and the packing machine. Due to technological reasons, most suitable store apparatus work in the system first in first out. This system eliminates drawbacks, which exist in the system first in, last out, where the cigarettes can stay in the store for a long time. Moreover, due to the enormous work speed, efficiency reaches 14,000 cigarettes per minute. Then, every break or slow down in one of the machines in the line forces the use of the compensating buffer store apparatus with large capacity. Only a variablecapacity store with an endless conveyor can be used, because the area assigned for the cigarette production line is limited. From the description of German patent DE 4.224.609, one known variablecapacity store working on the first in, first out system, comprises a transportation device for multilayered streams of cigarettes, transported along a helical track. The store consists of a first and second transportation section connected in series from the input station to the output station, which is situated at the ends of the mentioned helical track. The first and second transportation section is combined together by the deflecting device which drives both sections in that way, to change properly, the length of the transportation section occupied by the cigarettes, which results in a change in the capacity of the store. In the described variablecapacity store, in the place where the first section combines with the second section, transported by the deflecting device, the cigarettes are constantly pressed by the mentioned deflecting device, which can damage them. Another construction of the variable-capacity store for elongated elements, in particular tobacco products working on the first in, first out system, is known from the description of the European patent application EP.738.478. The mentioned store comprises the input station and the output station located in series, along the trajectory, along which the elongated articles are transported, and also the conveying means, with the variable length for transporting those elements, situated between the input station and the output station. The mentioned conveying means, comprises the endless conveyor, situated in the transport sector, where the elongated elements are stored and in the return sector where the conveyor is empty. The conveyor lengths in the sectors are variable and compensate each other in a manner that the total conveyor length is constant. The transport sector is located between the input station and the output station, the return sector is located between the output station and the input station. Moreover the store consists of the devices for changing the conveyor length in every sector in a manner that their length compensate each other. These devices have the first drive means connected to the transport sector, which can regulate the conveyor length of the first spiral in defined changes in that sector and the second drive means connected to the return sector which can regulate the conveyor length of the second spiral in defined changes in that sector. Equally the first spiral in the transport sector and the second spiral in the return sector are supported by the drums where, at least one in every sector can change their position being driven by the motor, which is the part of said variable devices for varying the conveyor length in every sector. The first and second spiral is wound on the proper assembly of the two drums, leaving identical distances between the curvatures or in different distances for every sector. The conveyor spirals of both sectors are situated beside, or the second conveyor spiral of the return sector is situated inside the first spiral of the transport sector. This solution demands very complicated, in respect to the regulation means, which are also mechanical, devices for changing the conveyor length in both sections, by which it is possible to obtain the proper change of length of the spiral in every sector after the signal is received from the sensor situated at the output of the cigarette production machine, and the input of the packing machine. Moreover the store depicted in the description and figures will be difficult to realise in respect to significant friction between the conveyor and drums, specially under the full load of the conveyor in the transport sector.

SUMMARY

An object of the invention is the construction of the variable-capacity buffer store for rod-shaped articles working on the first in, first out system, having the input station cooperating with the production machine and the output station cooperating with the receiving machine. The stations cooperate with an continuous endless conveyor for transporting the rod-shaped elements from the input station to the output station and the first part of which is situated in the transport sector between the input station and the output station and the second part of which is situated in the return sector and by the way the length of the conveyor in sectors compensates for each other. At the inlet of the transport sector is situated the first drive means of the conveyor, which is controlled by and connected to a fullness sensor assembled in the input station via a control unit, and at the exit of the transport sector is situated a second drive means of the conveyor which is controlled by and connected to a fullness sensor assembled in the output station via a control unit. The transport sector is determined by the two, active and passive, identical support guide means of the conveyor that consist of the independent disc modules rotary assembled on the axes, and the return sector is determined by the two, active and passive, identical support guide means of the conveyor that consist of the independent disc modules rotary assembled on the axes, and by the way, the axis of the active support guide means in the transport sector is fixed to the axis of the active support guide means in the return sector by a carriage moveably assembled on a horizontal guide bar on a frame of the store in a plane perpendicular to the axes. Equally in the transport sector and in the return sector, the disc modules are assembled at an angle to the axes of the support guide means, in a manner that, the planes of the disc modules in every support guide means are parallel to each other. The axes of all support guide means in the transport sector and in the return sector are situated beneficially in the one vertical plane. At the maximum capacity of the store, the axis of the active support guide means in the transport sector is the continuation of the axis of the passive support guide means in the return sector, and at the minimum capacity of the store, the axis of the passive support guide means in the transport sector is the continuation of the axis of the active support guide means in the return sector. The axes of the support guide means in the transport sector can be situated in the vertical plane, which is parallel to the plane defined by the axes of the support guide means in the return sector. Below the conveyor in the transport and return sector in the zone of action of the support guide means, are assembled to the frame, the horizontal guide bars supporting the conveyor. Moreover the store is equipped with a tensioning device for the conveyor. The input station and the output station are situated beneficially perpendicularly to the conveyor trajectory. This construction of the store enables temporary gathering of the rod-shaped elements in the transport sector in the form of continuous multilayer stream on the conveyor constructed of the segments and the maximum capacity of the store is defined by the maximum distance between the outer edges of the support guide means in the transport sector and by the amount of the employed disc modules in the support guide means situated there and by the height of the elements stream on the conveyor. The store adapts itself to the expected temporary capacity, and the change of the capacity is done automatically after the differences occur between the conveyor speed in the zones of the output and the input stations and the demanded capacity is retained, by the proper conveyor length which is made by a change of the carriage location, carrying with it the active support guide means, only as a result of the conveyor action cooperating with it and the disc modules of the said means. The linear speed of the conveyor in the input station zone, depends on the amount of the elements incoming from the production machine, and the linear speed of the conveyor in the output station zone, depends on the amount of the elements being received by the packing machine, and these speeds vary in a continuous way. Perpendicular location of the input station and the output station against the conveyor trajectory, enables the location of the production line in a group to form in a considerably small area.

BRIEF DESCRIPTION OF THE DRAWINGS

Reference is made hereinafter, by way of example only, to the accompanying diagrammatic drawings, in which:

FIGS. 1, 1A and 1B show a variable-capacity buffer store;

DETAILED DESCRIPTION

Figure 1:
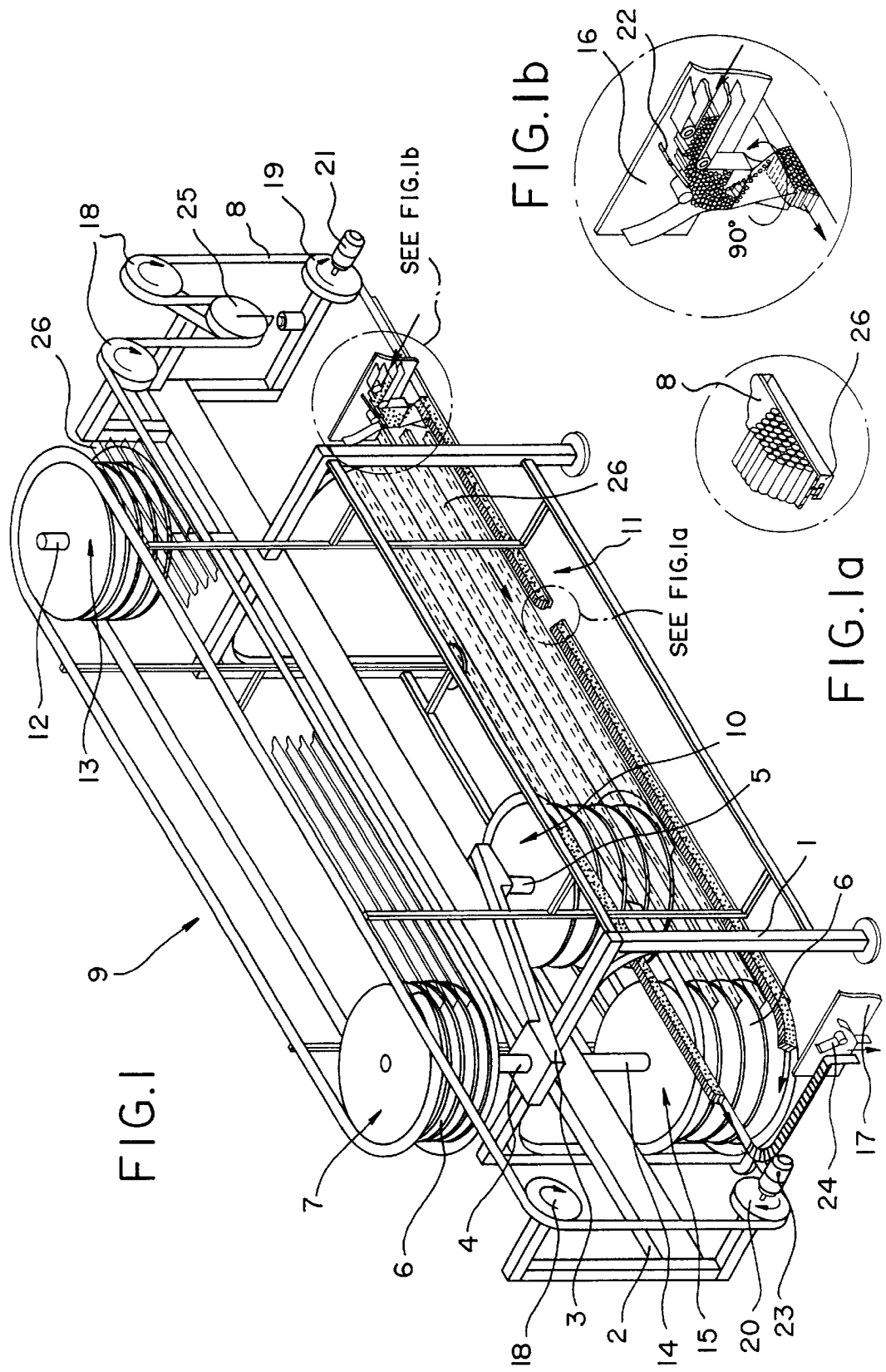
Figure 2:
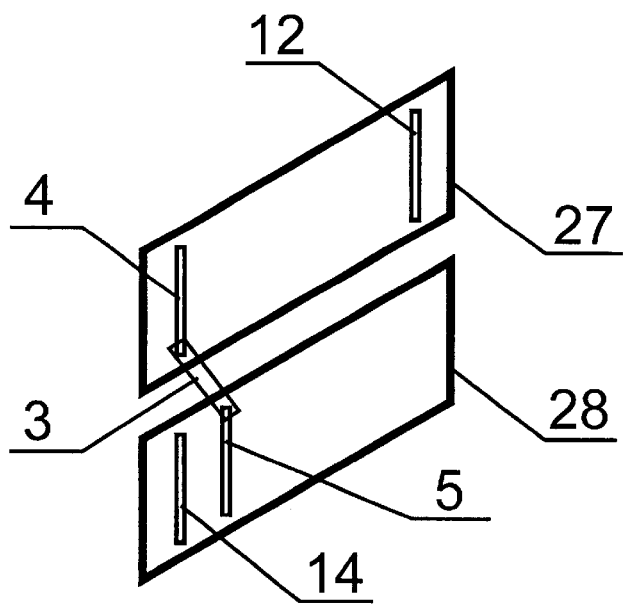
FIG. 2 shows two parallel planes, each plane defined by two axes of one of the disclosed support guide means shown in FIG. 1, the two planes being parallel to each other.

An object of the invention is depicted as in the example in FIG. 1, which shows the store in schematic form with the carriage determining the minimum capacity of the transport sector and for a better view of the individual elements, the conveyor and the guide bars are partially removed from FIG. 1, whereas some parts of the conveyor are shown additionally in the enlarged details, and the rod-shaped elements on the conveyor in the transport sector are shown fragmentarily. The variable-capacity store accordingly to FIG. 1, depicts the buffer store for cigarettes, located in the production line between the cigarette production machine and the packing machine, whereas exists the possibility, that the store cooperates with more than one production machine and simultaneously with more than one packing machine. The element supporting the store is frame 1 situated on the ground, consisting of the horizontal guide bar 2 of the carriage 3, which can move to and fro. With carriage 3 is fixed the vertical axis 4 directed upwards and the vertical axis 5 directed downwards, whereas the axes 4, 5 are situated in the one plane, but they are not collinear. The disc modules 6 are assembled on the axes 4, 5, whereas the axis 4 with the modules 6 constitute the active support guide means 7 of the conveyor 8 in the return sector 9 and the axis 5 with the modules 6 constitute the active support guide means 10 of the conveyor 8 in the transport sector 1I. To the frame 1 is fixed the vertical axis 12 directed upwards on which is assembled the disc modules 6 and the axis 12 with modules 6 constitute the passive support guide means 13 of the conveyor 8 in the return sector 9. On the opposite end of the frame 1 is fixed the vertical axis 14 directed downwards on which are assembled the disc modules 6 and the axis 14 with the modules 6 constitute the passive support guide means 15 of the conveyor 8 in the transport sector 11. The disc modules 6 are independently and rotarily mounted on all axes 4, 5, 12, 14, and, in this embodiment, all axes 4, 5, 12, 14 are situated on the one plane. The ending position of the active support guide means 10 of the conveyor 8 at the maximum distance between the axes 5 and 14 determine the maximum capacity of the transport sector 11. At the beginning of the transport sector 11, above the conveyor 8 is located perpendicular to the trajectory of the conveyor 8, the input station 16 receiving the cigarettes from the production machine, which is not shown on FIG. 1, putting the multilayer stream of cigarettes on the conveyor 8. At the end of the transport sector 11, there is situated, perpendicular to the trajectory of the conveyor 8 the output station 17 transferring the pile of the cigarettes from the conveyor 8 to the packing machine, which are not shown on FIG. 1. The length of the spatial spiral of the conveyor 8 between the input station 16 and the output station 17 in the transport sector 11, determines the temporary capacity of the store. The conveyor 8 constituents the segment belt with constant length which is simultaneously, the belt for transporting the cigarettes and the pulling belt, changing direction of the trajectory by the disc modules 6, rollers 18 and driving rollers 19 and 20. The part of the conveyor 8 from the output station 17 to the input station 16 constitutes the return sector 9 in which the length of the conveyor 8 determines the distance between the axes 4 and 12 of the active and passive support guide means 7 and 13, whereas the length of the conveyor 8 in the transport sector 11 and the return sector 9 compensate each other. At the maximum capacity of the store, the axis 5 of the active support guide means 10 in the transport sector 11 constitutes the continuation of the axis 12 of the passive support guide means 13 in the return sector 9 and at the minimum capacity of the store, the axis 14 of the passive support guide means 15 in the transport sector 11 constitutes the continuation of the axis 4 of the active support guide means 7 in the return sector 9. Moreover the store capacity is determined by the amount of layers of the conveyor 8 in the transport sector 11 corresponding to the amount of disc modules 6 in every support guide means 10 and 15. The succeeding layers of the conveyor 8 are achieved by the angle of the assembly of the disc modules 6 to the axes 5 and 14, which causes change of the trajectory level of the conveyor 8 and the entry to the following layer occurs in the area of contact with the circumference of the disc modules 6, which curvature constitutes the rising segment, changing direction 180 deg. and rise on every convolution is equal to a half distance of the centres of two neighbour disc modules 6. Whereas the straight segments of the spiral of the conveyor 8 the conveyor 8 in the return sector 9 determines the amount of disc modules 6 in every support guide means 7, 13 and the following levels of the spiral are obtained by the angle assembly of disc modules 6 to the axes 4 and 12 which causes the change of trajectory of the conveyor 8 and passing to the following level occurs in the area of contact with the circumference of disc modules 6, which curvature constitutes the segment dropping and changing direction 180 deg. and drop on every convolution is equal to a half of the distance between the centres of the two neighbour disc modules 6. Whereas the straight spiral segments of the conveyor 8 are parallel to each other and the plane of disc modules 6 in the support guide means 7 and also in the support guide means 13 are parallel to each other. At the inlet of the transport sector 11, before the input station 16 is joined to the drive roller 19 the first drive means 21 of the conveyor 8, which is controlled by and connected to the fullness sensor 22 installed in the input station 16 via the control unit, and at the exit of the transport sector 11 after the output station 17, there is connected to the drive roller 20, the second drive means 23 of the conveyor 8 which is controlled by and connected to the fullness sensor 24 installed in the output station 17 via the control unit. For eliminating looseness of the conveyor 8 tensioning device 25 is employed consisting of a mechanical roller pushed by an outside force. The conveyor 8 in every level of the transport sector 11 in the area where the support guide means 10 and 15 operate and also in every level of the return sector 9 in the area where the support guide means 7 and 13 operate are supported on the guide bars 26 fixed horizontally to the frame 1.

The store operates as follows: the cigarettes from the production machine are sent to the input station 16 and are transferred to the conveyor 8 as the multilayer stream with constant height. Every change of the amount of the sent cigarettes is detected by the fullness sensor 22, which is constructed as a deflecting arm. The varies of the angle of the arm deflection, generates an electrical signal, which after the proper treatment constitutes the basic parameter determining voltage supplying motor in the first drive means 21 combined to the drive roller 19 of the conveyor 8. The parameters of the signals are chosen in a manner that, the motor follows the temporary changes in the amount of the incoming cigarettes, enables the multilayer stream of cigarettes to remain at a constant height and continues movement of the conveyor 8 with the speed different from 0. In case the production cigarettes machine is arrested, or the amount of the supplied cigarettes to the input station 16 is diminished below the critical point, the drive means 21 is stopped and also with it the conveyor 8 is stopped in the place where it touches the drive roller 19. Accordingly in the output station 17 cigarettes are transferred from the conveyor 8, to the packing machine and the amount of the received cigarettes is shown by the fullness sensor 24 mounted in the output station 17 in a form of the deflective arm. Every change in the receiving cigarettes caused e.g. by slow down of the packing machine, makes changes of the arm deflecting angle, what generates an electrical signal, which after proper treatment, constitutes the basic parameters determining voltage for the motor in the second drive means 23 combined to the drive roller 20 of the conveyor 8. The parameters of the signals are chosen in a manner that, the motor follows after temporary changes in the amount of receiving cigarettes, enables the maintenance of the proper level of the cigarettes in the filling device in the packing machine. In case the packing machine is arrested, the drive means 23 is stopped and with it conveyor 8 is stopped in the place where it touches the drive roller 20. The differences in the speed of the conveyor 8 in the inlet and exit of the transport sector 11 force movement of the carriage 3, and the changes are linear. In a case when the amount of the cigarettes supplied from the production machine is equal to the amount of the cigarettes received by the packing machine, carriage 3 does not change its position. Therefore an arresting of the cigarette production machine, at the normal rate of work of the packing machine and immobilisation of drive roller 19 and also immobilising with it the conveyor 8 at the inlet of the transport sector 11, causes an automatic movement of the carriage 3 towards to the axis 14 of the passive support guide means 15 and the decreasing of the spirals of the conveyor 8 loaded by the multilayer stream of the cigarettes in the transport sector 11, at the simultaneous increment of the spiral of the conveyor 8 in the return sector 9 until the extreme point, when the production line will be switched off automatically. Similarly an arresting of the packing machine at the normal rate of work of the cigarette production machine and immobilisation of the drive roller 20 and also immobilising with it the conveyor 8 at the exit of the transport sector 11, causes an automatic movement of the carriage 3 towards to the axis 12 of the passive support guide means 13 and the increment of the spiral of the conveyor 8 loaded by the multilayer stream of cigarettes in the transport sector 11 at the simultaneous decrement of the spiral of the conveyor 8 in the return sector 9 until the extreme point, when the production line will be switched off automatically.

Figures 3, 4:
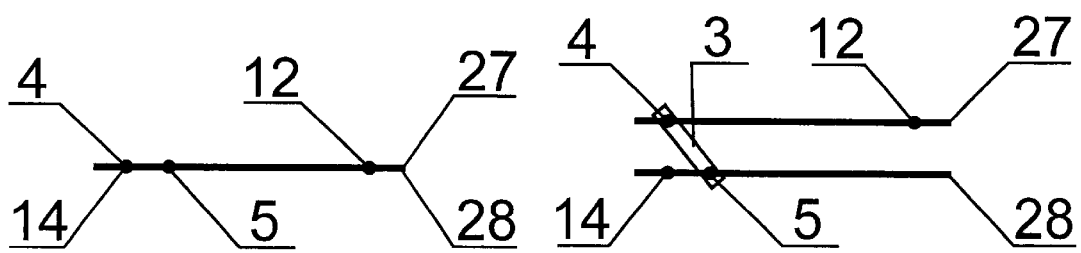
FIG. 3 shows a top view of the planes shown in FIG. 2, wherein the two planes are coplanar.
FIG. 4 shows a top view of the planes shown in FIG. 2, when the two planes are coplanar.
Figure 5:
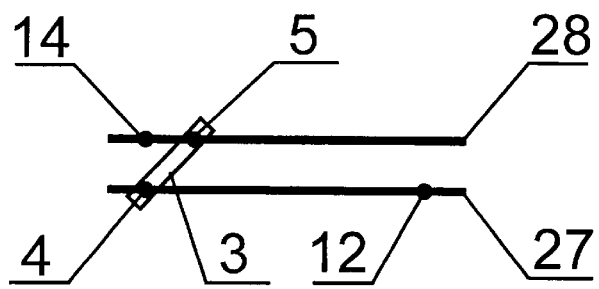
FIG. 5 shows a top view of the planes shown in FIG. 2, the two parallel planes displaced differently than in FIG. 4.

FIGS. 4 and 5 show other embodiments of the variable-capacity store. In these embodiments, a plane 27 defined by axes 4 and 12 is parallel to a plane 28 defined by axes 14 and 5.

What is claimed is:

1. A variable-capacity buffer store for rod-shaped articles working in the system, first in, first out, comprising an input station (16) connectable to a production machine and an output station (17) connectable to a receiving machine, and both the input station (16) and the output station (17) cooperate with a continuous endless conveyor (8), carrying rod-shaped articles from the input station (16) to the output station (17), a first part of the conveyor is situated in a transport sector (11) and a second part of the conveyor is situated in a return sector (9), and the length of the conveyor (8) in both of the sectors (9, 11) compensate for each other, characterised in that, at the inlet of the transport sector (11) is situated a first drive means (21) of the conveyor (8) which is controlled by and connected to a fullness sensor (22) assembled in the input station (16) via a control unit, and at the exit of the transport sector (11) is situated a second drive means (23) of the conveyor (8) which is controlled by and connected to a fullness sensor (24) assembled in the output station (17) via a control unit, wherein the transport sector (11) consists of two, active and passive, identical support guide means (10, 15) of the conveyor (8) that consist of independent disc modules (6) rotary assembled on axes (5, 14), and the return sector (9) consists of two, active and passive, identical support guide means (7, 13) of the conveyor (8) that consist of independent disc modules (6) rotary assembled on axes (4, 12), the axis (5) of the active support guide means (10) in the transport sector (11) is fixed to the axis (4) of the active support guide means (7) in the return sector (9) by a movable carriage (3) assembled on a horizontal guide bar (2) on a frame (1) of the store, the carriage movable in a plane perpendicular to the axes (5,4) fixed thereon.

2. A variable-capacity store as claim 1, characterised in that, the disc modules (6) are assembled at an angle to the axes (4, 5, 12, 14) of the support guide means (7, 10, 13, 15) and the plane of the disc modules (6) in every support guide means (7, 10, 13, 15) are parallel to each other.

3. A variable-capacity store as claim 2, characterised in that, the axes (4, 5, 12, 14) of all the support guide means (7, 10, 13, 15) are situated in one vertical plane.

4. A variable-capacity store as claim 2, characterised in that, the axes (5, 14) of the support guide means (10, 15) in the transport sector (11) are situated in the vertical plane, while the axes (4, 12) of the support guide means (7, 13) in the return sector (9) are situated in a parallel vertical plane.

5. A variable-capacity store as claim 3, characterised in that, at the maximum capacity of the store, the axis (5) of the active support guide means (10) in the transport sector (11) is the continuation of the axis (12) of the passive support guide means (13) in the return sector (9) and at the minimum capacity of the store the axis (14) of the passive support guide means (15) in the transport sector (11) is the continuation of the axis (4) of the active support guide means (7) in the return sector (9).

6. The variable-capacity buffer store of claim 1, further comprising:

horizontal guide bars (26) attached to the frame (1), wherein the horizontal guide bars (26) support the conveyor (8) and are arranged to facilitate the transfer of the conveyor (8) to and from the support guide means (7, 10, 13, 15).

7. A variable-capacity store as claim 1, characterised in that it consists of a tensioning device (25) for the conveyor (8).

8. A variable-capacity store as claim 1, characterised in that, the input station (16) and the output station (17) are situated perpendicular to the conveyor (8) trajectory.

* * * * *